(12) United States Patent
Shao et al.

(10) Patent No.: US 9,437,899 B2
(45) Date of Patent: Sep. 6, 2016

(54) SOLID-STATE RECHARGEABLE MAGNESIUM BATTERY

(71) Applicant: Battelle Memorial Institute, Richland, WA (US)

(72) Inventors: Yuyan Shao, Richland, WA (US); Jun Liu, Richland, WA (US); Tianbiao Liu, Richland, WA (US); Guosheng Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 97 days.

(21) Appl. No.: 14/177,115

(22) Filed: Feb. 10, 2014

(65) Prior Publication Data

US 2015/0229000 A1    Aug. 13, 2015

(51) Int. Cl.

| | |
|---|---|
| *H01M 10/00* | (2006.01) |
| *H01M 10/054* | (2010.01) |
| *H01M 10/0565* | (2010.01) |
| *H01M 4/38* | (2006.01) |
| *H01M 10/0566* | (2010.01) |
| *H01M 10/0567* | (2010.01) |
| *H01M 10/056* | (2010.01) |
| *H01M 10/0569* | (2010.01) |

(Continued)

(52) U.S. Cl.
CPC ............ *H01M 10/054* (2013.01); *H01M 4/38* (2013.01); *H01M 10/0565* (2013.01); *H01M 4/466* (2013.01); *H01M 4/5815* (2013.01); *H01M 4/5825* (2013.01); *H01M 10/056* (2013.01); *H01M 10/0566* (2013.01); *H01M 10/0567* (2013.01); *H01M 10/0569* (2013.01); *H01M 2300/0082* (2013.01)

(58) Field of Classification Search
CPC ........... H01M 10/054; H01M 10/056; H01M 10/0568; H01M 10/0569; H01M 10/0567; H01M 10/0566; H01M 10/0565; H01M 2300/0082; H01M 4/38; H01M 4/5815; H01M 4/5825; H01M 4/466
See application file for complete search history.

(56) References Cited

U.S. PATENT DOCUMENTS

| | | |
|---|---|---|
| 6,180,287 B1 | 1/2001 | Watanabe et al. |
| 6,713,212 B2 | 3/2004 | Aurbach et al. |

(Continued)

FOREIGN PATENT DOCUMENTS

| | | |
|---|---|---|
| JP | 2013239353 A | 11/2013 |
| WO | WO 2009/097654 A1 | 8/2009 |

(Continued)

OTHER PUBLICATIONS

Sigma-Aldrich "Poly(ethylene glycol) and Poly(ethylene oxide)".*

(Continued)

*Primary Examiner* — Milton I Cano
*Assistant Examiner* — Stephen Yanchuk
(74) *Attorney, Agent, or Firm* — Klarquist Sparkman, LLP (57) ABSTRACT

Embodiments of a solid-state electrolyte comprising magnesium borohydride, polyethylene oxide, and optionally a Group IIA or transition metal oxide are disclosed. The solid-state electrolyte may be a thin film comprising a dispersion of magnesium borohydride and magnesium oxide nanoparticles in polyethylene oxide. Rechargeable magnesium batteries including the disclosed solid-state electrolyte may have a coulombic efficiency ≥95% and exhibit cycling stability for at least 50 cycles.

18 Claims, 4 Drawing Sheets
(3 of 4 Drawing Sheet(s) Filed in Color)

(51) Int. Cl.
H01M 4/58 (2010.01)
H01M 4/46 (2006.01)

(56) References Cited

U.S. PATENT DOCUMENTS

| | | |
|---|---|---|
| 2007/0048605 A1 | 3/2007 | Pez et al. |
| 2008/0063945 A1 | 3/2008 | Ivanov et al. |
| 2008/0182176 A1 | 7/2008 | Aurbach et al. |
| 2011/0117454 A1 | 5/2011 | Winther-Jensen et al. |
| 2013/0196055 A1 | 8/2013 | Berta et al. |
| 2013/0202971 A1 | 8/2013 | Zhao et al. |
| 2014/0154592 A1* | 6/2014 | Mohtadi ............. H01M 10/054 429/344 |

FOREIGN PATENT DOCUMENTS

| | | |
|---|---|---|
| WO | WO 2012/041434 A1 | 4/2012 |
| WO | WO 2013/122783 A1 | 8/2013 |

OTHER PUBLICATIONS

Acosta, J.L., "Synthesis and Characterization of Polymeric Electrolytes for Solid State Magnesium Batteries," *Electrochimica Acta*, vol. 43, No. 7, pp. 791-797 (1998).

Aurbach, Doron et al., "Electrolyte Solutions for Rechargeable Magnesium Batteries Based on Organomagnesium Chloroaluminate Complexes," *Journal of Electrochemical Society*, vol. 149, Issue 2, pp. A115-A121 (2002, published online Dec. 20, 2001).

Chusid, Orit et al., "Solid-State Rechargeable Magnesium Batteries," *Advanced Materials*, vol. 15, No. 7-8, pp. 627-630 (Apr. 17, 2003).

Croce, F. et al., "Nanocomposite Polymer Electrolytes for Lithium Batteries," *Nature*, 294, 456-458 (Jul. 30, 1998).

Kim, D.J. et al., "Electrochemical Properties of Magnesium Electrolyte with Organic Solvent," *Physica Scripta*, pp. 70-73 (Nov. 23, 2007).

Kumar, G. Girish et al., "Effect of Plasticizers on Magnesium-Poly(Ethyleneoxide) Polymer Electrolyte," *Journal of Electroanalytical Chemistry*, vol. 495, pp. 42-50 (2000).

Kumar, G. Girish et al., "Poly(Methylmethacrylate)—Magnesium Triflate Gel Polymer Electrolyte for Solid State Magnesium Battery Application," *Electrochimica Acta*, vol. 47, pp. 1013-1022 (2002).

Kumar, G.Girish et al., "A Gel Polymer Electrolyte of Magnesium Triflate," *Solid State Ionics*, vol. 128, pp. 203-210 (Feb. 2000).

Kumar, G.Girish et al., "Reversibility of Mg/$Mg^{2+}$ Couple in a Gel Polymer Electrolyte," *Electrochimica Acta*, vol. 44, pp. 2663-2666 (1999).

Mohtadi, Rana et al., "Magnesium Borohydride: From Hydrogen Storage to Magnesium Battery," *Angewandte Chemie International Edition*, vol. 51, pp. 9780-9783 (Aug. 21, 2012).

Morita, Masayuki et al., "Rechargeable Magnesium Batteries Using a Novel Polymeric Solid Electrolyte," *Journal of Electrochemical Society*, vol. 4 (11), pp. A177-A179 (Aug. 21, 2001).

Narayanan, N. S. Venkata et al., "Magnesium Ion Conducting, Room Temperature Molten Electrolytes," *Electrochemistry Communications*, vol. 11, Issue 10, pp. 2027-2031 (Aug. 29, 2009).

Pandey G.P. et al., "Magnesium Ion-Conducting Gel Polymer Electrolytes Dispersed with Nanosized Magnesium Oxide," *Journal of Power Sources*, vol. 190, pp. 563-572 (Jan. 30, 2009).

Pandey, G.P. et al., "Magnesium Ion-Conducting Gel Polymer Electrolytes Dispersed with Fumed Silica for Rechargeable Magnesium Battery Application," *Journal of Solid State Electrochemistry*, vol. 15, pp. 2253-2264 (2011, published online Nov. 25, 2010).

Polu, Anji Reddy et al., "Effect of $TiO_2$ Ceramic Filler on PEG-Based Composite Polymer Electrolytes for Magnesium Batteries," *AIP Conf. Proc.* 1512, 996 (published online Feb. 5, 2013).

Shao, Yuyan et al., "Coordination Chemistry in Magnesium Battery Electrolytes: How Ligands Affect Their Performance," *Scientific Reports*, vol. 3, No. 3130, DOI: 10.1038/srep03130 (Nov. 4, 2013).

Shao, et al., U.S. Appl. No. 13/858,764, titled "Energy Storage Devices Having Anodes Containing Mg and Electrolytes Utilized Therein," filed Apr. 8, 2013.

Sharma, Jyoti et al., "Magnesium Ion Transport in Poly(Ethylene Oxide)-Based Polymer Electrolyte Containing Plastic-Crystalline Succinonitrile," *Journal of Solid State Electrochemistry*, vol. 17, pp. 2283-2291 (May 9, 2013).

Shindo, Kazuhiko et al., "Influence of Electrode Materials on Open-Circuit Voltage Profiles With a Temperature Difference for a Thermocell Using a $Br_2$/Br-Redox Reaction," *Journal of Power Sources*, vol. 110, pp. 46-51 (2002).

Sundar, M. et al., "Effect of Fillers on Magnesium Poly(Ethylene Oxide) Solid Polymer Electrolyte," *Ionics*, vol. 12, pp. 281-286 (Oct. 11, 2006).

Tripathi, S.K. et al., "Electrical and Electrochemical Studies on Magnesium Ion-Based Polymer Gel Electrolytes," *Journal of Solid State Electrochemistry*, vol. 16, pp. 1799-1806 (Jan. 25, 2012).

Yoshimoto, Nobuko et al., "A Novel Polymeric Gel Electrolyte Systems Containing Magnesium Salt With Ionic Liquid," *Electrochimica Acta*, vol. 50, pp. 3866-3871 (May 23, 2005).

Yoshimoto, Nobuko et al., "Rechargeable Magnesium Batteries with Polymeric Gel Electrolytes Containing Magnesium Salts," *Electrochimica Acta*, vol. 48, pp. 2317-2322 (2003).

\* cited by examiner

SOLID-STATE RECHARGEABLE MAGNESIUM BATTERY

ACKNOWLEDGMENT OF GOVERNMENT SUPPORT

This invention was made with government support under DE-AC0576RLO1830 awarded by the U.S. Department of Energy. The government has certain rights in the invention.

FIELD

Disclosed are solid-state electrolytes for use with magnesium batteries, such as rechargeable magnesium batteries, methods of making solid-state electrolytes, and batteries including solid-state electrolytes.

BACKGROUND

Low-cost and high-safety battery technologies are critical for both transportation and grid energy storage applications. Significant efforts have been made in the past years to move beyond lithium-ion battery technology. Magnesium batteries are one promising technology because of the high volumetric capacity (3832 mAh/cm$^3$ for Mg metal, in comparison to 2062 mAh/cm$^3$ for Li metal and 1136 mAh/cm$^3$ for Na metal), improved safety (nondendritic and less chemically active compared to Na and Li metal), and potentially low cost given the natural abundance of magnesium.

SUMMARY

Disclosed are solid-state electrolytes for use with magnesium batteries, such as rechargeable magnesium batteries, methods of making solid-state electrolytes, and batteries including solid-state electrolytes. Embodiments of the disclosed electrolytes include a solid state composition comprising magnesium borohydride (Mg(BH$_4$)$_2$) and polyethylene oxide (PEO). The electrolyte may include 3-30 wt % Mg(BH$_4$)$_2$ and 55-97 wt % PEO, based on a total weight of the electrolyte. In some embodiments, the electrolyte is a solid dispersion of Mg(BH$_4$)$_2$ in PEO. The electrolyte may be in the form of a thin film.

In some embodiments, the electrolyte further includes a metal oxide, wherein the metal is a Group IIA metal, a transition metal, or a combination thereof. In such embodiments, the electrolyte made include 3-30 wt % Mg(BH$_4$)$_2$, 55-92 wt % PEO, and 5-15 wt % metal oxide, based on a total weight of the electrolyte. In certain embodiments, the metal oxide is MgO, TiO$_2$, ZrO$_2$, or a combination thereof. The metal oxide may be metal oxide nanoparticles having an average diameter ≤500 nm. In some embodiments, the electrolyte is a solid dispersion of Mg(BH$_4$)$_2$ and the metal oxide nanoparticles in PEO.

In some embodiments, the electrolyte consists essentially of, or consists of, Mg(BH$_4$)$_2$, PEO, and metal oxide. For example, the electrolyte may consist essentially of 3-30 wt % Mg(BH$_4$)$_2$, 55-92 wt % PEO, and 5-15 wt % MgO nanoparticles having an average diameter ≤500 nm, wherein the weight percentages are based on a total weight of the electrolyte.

Embodiments of a rechargeable battery include an anode comprising magnesium, a cathode, and a solid-state electrolyte as disclosed herein. In some embodiments, the anode is magnesium metal. The cathode may comprise stainless steel, Mo$_6$S$_8$, Mg$_2$Mo$_6$S$_8$, MoS$_2$, Mo$_6$S$_{8-y}$Se$_y$ where y=0, 1, or 2, Mg$_x$S$_3$O$_4$ where 0<x<1, MgCoSiO$_4$, MgFeSiO$_4$, MgMn- SiO$_4$, V$_2$O$_5$, WSe$_2$, sulfur, poly(2,2,6,6-tetramethylpiperidinyloxy-4-yl methacrylate)/graphene, MnO$_2$/acetylene black, or carbyne polysulfide. In some embodiments, the anode has a capacity fade of less than 20% after 50 discharge/charge cycles, and/or the battery has a coulombic efficiency ≥95%.

A method of making a solid-state magnesium electrolyte includes (i) forming an electrolyte mixture comprising Mg(BH$_4$)$_2$, PEO, and, optionally, a metal oxide comprising a Group IIA metal, a transition metal, or a combination thereof, and (ii) forming a thin film of the electrolyte mixture.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2a and 2b are surface top view images; FIGS. 2c and 2d are cross-section images.

DETAILED DESCRIPTION

Solid-state batteries provide great advantages such as flexibility in dimensions and geometry, ease of fabrication, potentially high energy density, and safety. Rechargeable magnesium batteries with magnesium anodes are attractive because magnesium has a high specific capacity (2205 mAh/g, 3832 mAh/cm$^3$), and is abundant (terrestrial abundance 1.94%), inexpensive, and less hazardous than lithium. Solid-state magnesium conducting electrolytes described in the literature are based on conventional magnesium salts such as magnesium triflate (Mg(SO$_3$CF$_3$)$_2$) or magnesium perchlorate (Mg(ClO$_4$)$_2$). However, these electrolytes are unable to produce reversible magnesium plating/stripping, and therefore are not suitable for practical rechargeable magnesium batteries. Other Mg batteries include an electrolyte comprising a liquid component. No solely solid-state rechargeable Mg battery is available. Accordingly, disclosed are embodiments of all solid-state electrolytes that can produce reversible magnesium plating/stripping and/or reversible intercalation/de-intercalation.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

In order to facilitate review of the various embodiments of the disclosure, the following explanations of specific terms are provided:

All solid state: Consisting solely of solid components; not including a liquid component.

Anode: An electrode through which electric charge flows into a polarized electrical device. In a discharging battery, such as the disclosed magnesium batteries or a galvanic cell, the anode is the negative terminal where electrons flow out. When the anode is composed of a metal, electrons that it gives up to the external circuit are accompanied by metal cations moving away from the electrode and into the electrolyte.

Battery lifetime: The battery lifetime includes calendar lifetime and cycle lifetime. The calendar lifetime is the length of time a battery can last under normal operation (i.e., normal discharge/charge under certain conditions like temperature); the cycle lifetime is the number of cycles that a battery can be discharged/charged without significant performance fading.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Capacity fade: A decrease in capacity during battery cycling (i.e., discharge/charge cycles). Capacity fade can be calculated from coulombic efficiency (CE) according to the following equation:

$$\text{capacity fade} = 1 - (CE)^n, \; n = \text{cycle number}$$

Cathode: An electrode through which electric charge flows out of a polarized electrical device. From an electrochemical point of view, positively charged cations move toward the cathode and/or negatively charged anions move away from it to balance the electrons arriving from external circuitry. In a discharging battery, such as the disclosed magnesium batteries or a galvanic cell, the cathode is the positive terminal, toward the direction of conventional current. This outward charge is carried internally by positive ions moving from the electrolyte to the positive cathode.

Cell: As used herein, a cell refers to an electrochemical device used for generating a voltage or current from a chemical reaction, or the reverse in which a chemical reaction is induced by a current. A battery includes one or more cells. The terms "cell" and "battery" are used interchangeably when referring to a battery containing only one cell.

Coin cell: A small, typically circular-shaped battery. Coin cells are characterized by their diameter and thickness. For example, a type 2325 coin cell has a diameter of 23 mm and a height of 2.5 mm.

Coulombic efficiency: A term referring to the efficiency with which charges (electrons) are transferred in an electrochemical system. Coulombic efficiency is the ratio of charge exciting the battery during the discharge cycle to the charge entering the battery during the charging cycle. Coulombic efficiency typically is less than 100% due to secondary reactions, e.g., water electrolysis and/or other redox reactions occurring in the battery.

Current density: A term referring to the amount of current per unit area of electrode. Current density is typically expressed in units of mA/cm$^2$.

Dispersion: A system in which particles are distributed throughout a continuous phase of a different composition. A solid dispersion is a system in which at least one solid component is distributed throughout another solid component.

Electrolyte: A substance containing free ions that behaves as an electrically conductive medium.

Intercalation: A term referring to the insertion of a material (e.g., an ion or molecule) into the microstructure of another material. For example, lithium ions can insert, or intercalate, into graphite (C) to form lithiated graphite (LiC$_6$). De-intercalation refers to the extraction of a material from the microstructure of another material. For example, lithium ions can de-intercalate from lithiated graphite to re-form graphite.

Nanoparticle: A nanoscale particle with a size that is measured in nanometers, for example, a particle that has at least one dimension of less than about 100 nm.

PEO: polyethylene oxide

Solid state: Composed of solid components.

Specific capacity: A term that refers to capacity per unit of mass of the electrode (or active material). Specific capacity may be expressed in units of mAh/g.

II. Solid-State Electrolyte

Embodiments of the disclosed solid-state electrolytes produce reversible magnesium plating/stripping and/or intercalation/de-intercalation, depending on the cathode material. Furthermore, the disclosed electrolytes are "all solid-state" when present in a battery, i.e., the electrolyte does not comprise a liquid component when present in the battery. In contrast, other "solid state" electrolytes, such as polymer electrolytes, generally include at least a small amount of a liquid solvent (typically as a plasticizer). As used hereafter, the term "solid-state" electrolyte refers to an "all solid-state" electrolyte after the electrolyte is made and/or when the electrolyte is present in a battery.

The solid-state electrolyte comprises magnesium borohydride ($Mg(BH_4)_2$) and polyethylene oxide (PEO). Other suitable polymers may include, for example, polymers having a backbone comprising repeating units of —$OCH_2$—, i.e., —$(OCH_2)_n$—, where n is an integer. In some embodiments, the solid-state electrolyte further comprises a ceramic, such as a Group IIA metal oxide or a transition metal oxide. Suitable metal oxides include, but are not limited to, $MgO$, $TiO_2$, $ZrO_2$, and combinations thereof. The foregoing list of metal oxides does not imply that the recited metal oxides are equivalently suitable and/or would provide equivalent electrolyte performance. The metal oxide may be in the form of nanoparticles, e.g., nanoparticles having an average diameter of ≤500 nm, ≤250 nm, ≤100 nm, or ≤50 nm. The foregoing list of size ranges is not intended to indicate that all embodiments are equivalent and/or equally suitable. In some embodiments, nanoparticles at the smaller end of the range (e.g., ≤100 nm or ≤50 nm) may provide better performance. Additionally, size uniformity may produce higher performance. Accordingly, in some embodiments, the nanoparticles have a size dispersity of ≤50%, ≤25%, ≤15%, or ≤10% relative to an average size of the nanoparticles. In some examples, the solid-state electrolyte is a solid dispersion of $Mg(BH_4)_2$, PEO, and metal oxide nanoparticles (e.g., MgO).

The PEO may have an average molecular weight of 100,000 to 8,000,000 daltons, such as 100,000 to 5,000,000 daltons, 100,000 to 1,000,000 daltons, 200,000 to 1,000,000 daltons, 300,000 to 1,000,000 daltons, 300,000 to 900,000 daltons, 300,000 daltons, 400,000 daltons, 600,000 daltons, 900,000 daltons, 1,000,000 daltons, 2,000,000 daltons, 4,000,000 daltons, 5,000,000 daltons, 7,000,000 daltons, or 8,000,000 daltons. The foregoing list is not intended to indicate that all embodiments are equivalent and/or equally suitable.

Embodiments of the solid-state electrolyte comprise 3-30 wt % $Mg(BH_4)_2$ and 55-97 wt % PEO. In some embodiments, the solid-state electrolyte comprises 3-30 wt % $Mg(BH_4)_2$, 55-92 wt % PEO, and 5-15 wt % metal oxide. For example, the solid-state electrolyte may comprise 5-25 wt %, $Mg(BH_4)_2$, 63-88 wt % PEO, and 7-12 wt % metal oxide, or the solid-state electrolyte may comprise 5-15 wt % $Mg(BH_4)_2$, 73-88 wt % PEO, and 7-12 wt % metal oxide. In some examples, the solid-state electrolyte comprises 10 wt % $Mg(BH_4)_2$, 80 wt % PEO, and 10 wt % metal oxide. In certain embodiments, the metal oxide is MgO. The MgO may be in the form of nanoparticles having an average diameter of ≤50 nm.

The solid-state electrolyte, when present in a battery, may consist essentially of, or consist of, $Mg(BH_4)_2$, PEO, and metal oxide. In one embodiment, the solid-state electrolyte consists essentially of, or consists of, 5-25 wt % $Mg(BH_4)_2$, 63-88 wt % PEO, and 5-15 wt % metal oxide. In another embodiment, the solid-state electrolyte consists essentially, or consists of, of 5-15 wt % $Mg(BH_4)_2$, 73-88 wt % PEO, and 7-12 wt % metal oxide. In some examples, the solid-state electrolyte consists essentially, or consists of, of 10 wt % $Mg(BH_4)_2$, 80 wt % PEO, and 10 wt % metal oxide. In one embodiment, the solid-state electrolyte consists essentially, or consists of, of 10 wt % $Mg(BH_4)_2$, 80 wt % PEO, and 10 wt % MgO. In certain examples, the PEO has an average molecular weight of 600,000, and the MgO nanoparticles have an average diameter ≤50 nm.

The solid-state electrolyte may be provided as a thin film having an average thickness in the range of 15-400 µm. In some embodiments, the film has an average thickness of 50-300 µm, 100-250 µm, 100-200 µm, or 150-200 µm. The film may be a solid dispersion of $Mg(BH_4)_2$, PEO, and, optionally, a metal oxide. In certain embodiments, the film is a solid dispersion consisting essentially or, or consisting of, $Mg(BH_4)_2$, PEO, and MgO nanoparticles.

Embodiments of the disclosed electrolyte are prepared by mixing desired amounts of $Mg(BH_4)_2$, PEO, and, optionally, a Group IIA metal oxide or transition metal oxide. In one embodiment, the $Mg(BH_4)_2$, PEO, and (optional) metal oxide are placed in a closed container and ball-milled for a period of time effective to produce a substantially homogeneous mixture. The effective period of time may be several hours, for example, 12-36 hours. In some examples, the components were ball-milled for 24 hours. The mixture is transferred to a die and hot-pressed to form a semitransparent thin film. In some embodiments, the mixture is hot-pressed at a pressure of 4000-5000 kg and a temperature of 65-150° C. The mixture may be hot-pressed for 10-60 minutes, such as from 10-30 minutes, to produce the semi-transparent thin film. In certain examples, the mixture was hot-pressed at 120° C. with a pressure of 10,000 lb (4540 kg) for 20 minutes. In certain embodiments, the ball-milling and/or hot-press processes are performed without exposure to air, i.e., in an inert atmosphere, such as argon.

In another embodiment, desired amounts of the $Mg(BH_4)_2$, PEO, and (optional) metal oxide are mixed with a solvent to produce a substantially homogeneous dispersion. Suitable solvents include, but are not limited to, tetrahydrofuran and dimethoxyethane. The components may be mixed with the solvent in a ratio of 20-30% solids and 70-80% solvent. The dispersion is then cast in a die, and the solvent is removed through evaporation without exposure to air or moisture to produce an all solid-state electrolyte.

III. Batteries

Figure 1:
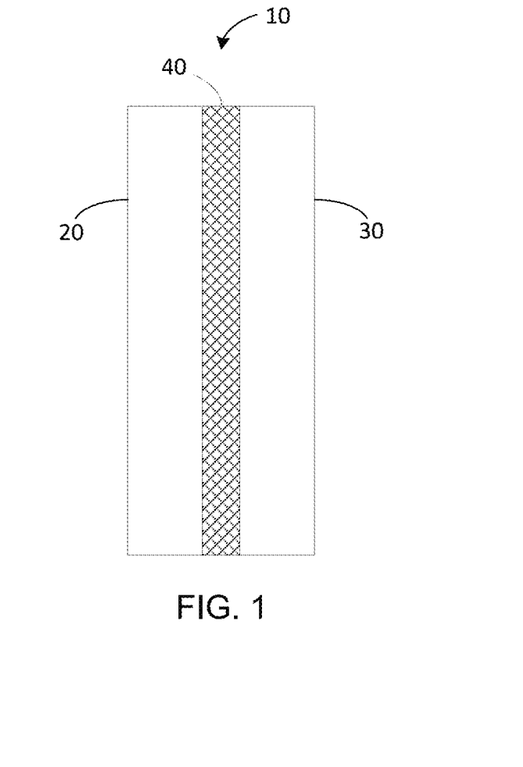
FIG. 1 is a schematic cross-section of one embodiment of a rechargeable magnesium battery.

Embodiments of a rechargeable magnesium battery 10 may comprise an anode 20, a cathode 30, and a solid-state electrolyte 40 as described herein (FIG. 1). The solid-state electrolyte 40 may be a thin film, e.g., with an average thickness of 15-400 µm, such as an average thickness of 100-300 µm or 150-200 µm. The anode 20 comprises magnesium or a magnesium alloy (e.g., magnesium alloys with Bi, Sn, Sb and their alloys, a magnesium/aluminum/zinc, magnesium/aluminum/manganese, magnesium/zinc/zirconium, or magnesium/zinc/copper alloy). A magnesium metal anode may be polished to remove any surface oxides and produce a conductive magnesium surface. Suitable cathodes 30 include, but are not limited to, cathodes comprising stainless steel, $Mo_6S_8$ (e.g., $Mo_6S_8$ Chevrel phase), $Mg_2Mo_6S_8$, $MoS_2$, $Mo_6S_{8-y}Se_y$, where y=0, 1, or 2, $Mg_xS_3O_4$ where 0<x<1, $MgCoSiO_4$, $MgFeSiO_4$, $MgMnSiO_4$, $V_2O_5$, $WSe_2$, sulfur, poly(2,2,6,6-tetramethylpiperidinyloxy-4-yl methacrylate)/graphene, $MnO_2$/acetylene black, or carbyne polysulfide. The foregoing lists of anode and cathode materials do not imply that the recited materials are equivalently suitable and/or would provide equivalent battery performance.

Embodiments of the disclosed magnesium batteries exhibit reversible magnesium plating/stripping at the anode and/or reversible magnesium intercalation/de-intercalation at the cathode. Thus, the batteries are rechargeable. In some embodiments, a magnesium battery comprising the disclosed solid-state electrolyte has an increased battery lifetime compared to other magnesium batteries including a conventional electrolyte. The solid-state electrolyte does not suffer from solvent evaporation, an issue that causes batteries with conventional electrolytes to fail over time.

Figure 3A:
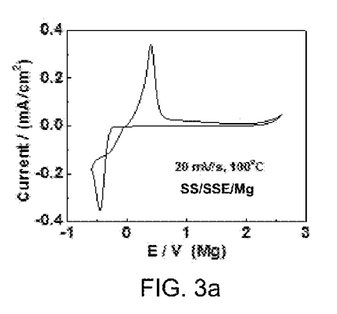
FIG. 3a is a cyclic voltammogram showing magnesium plating and stripping on a stainless steel electrode in a coin cell including a Mg(BH$_4$)$_2$—MgO-PEO solid-state electrolyte (SSE) between a stainless steel cathode and a magnesium anode. The cyclic voltammogram was produced under conditions of 20 mV/s and 100° C.
Figure 3B:
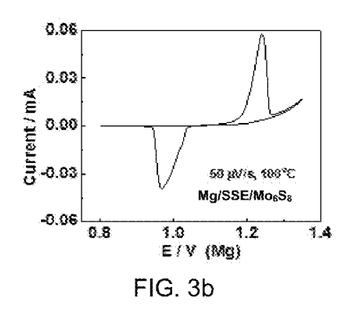
FIG. 3b is a cyclic voltammogram showing magnesium intercalation/de-intercalation in a coin cell including a magnesium anode, a Mo$_6$S$_8$ cathode, and a Mg(BH$_4$)$_2$—MgO-PEO solid-state electrolyte (SSE). The cyclic voltammogram was produced under conditions of 50 µV/s and 100° C.
Figure 3C:
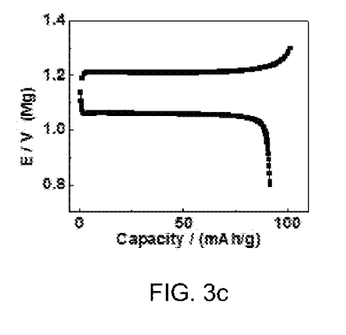
FIG. 3c shows discharge and charge curves of an embodiment of a Mg/Mg(BH$_4$)$_2$—MgO-PEO/Mo$_6$S$_8$ battery.
Figure 4:
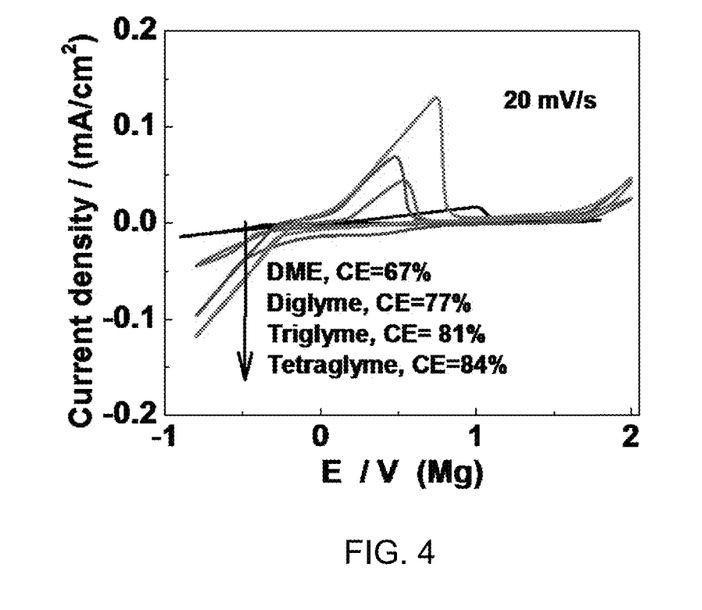
FIG. 4 is a series of cyclic voltammograms showing magnesium plating and stripping on a stainless steel electrode in a three-electrode cell including an electrolyte comprising Mg(BH$_4$)$_2$ and a short-chain glyme (dimethoxy ethane (DME), diglyme (diglycol methyl ether), triglyme (triethylene glycol dimethyl ether), or tetraglyme (tetraethylene glycol dimethyl ether)), a platinum working electrode, a magnesium counter electrode, and a magnesium reference electrode.

In some embodiments, a magnesium battery comprising a solid-state electrolyte as disclosed herein has improved cycling stability compared to a magnesium battery comprising a conventional electrolyte. Cycling stability can be evaluated by the coulombic efficiency and/or the capacity fade within a certain number of cycles. Embodiments of the disclosed batteries may have a coulombic efficiency near 100%, such as a coulombic efficiency ≥95%, ≥97%, ≥98%, or ≥99% (see, e.g., FIGS. 3a, 3b). In one example, the voltage gap between onset potential for magnesium plating and magnesium stripping was only 0.2V, which could lead to high energy efficiency. In contrast, electrolytes including $Mg(BH_4)_2$ in a liquid solvent have a lower coulombic efficiency for Mg plating/stripping. For example, a liquid electrolyte comprising $Mg(BH_4)_2$ in a short-chain glyme solvent had a coulombic efficiency ranging from 67-84% (see, e.g., FIG. 4). In some examples, the solid state electrolyte is able to support greater current density than a non-solid-state electrolyte as seen by comparing FIGS. 3a and 4. Some embodiments of the disclosed batteries also maintain a substantially constant voltage during charge/discharge as evidenced by flat plateaus on the charge/discharge curves (see, e.g., FIG. 3c).

Figure 3D:
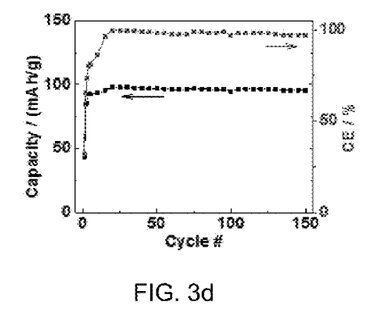
FIG. 3d shows the cycling stability of an embodiment of a Mg/Mg(BH$_4$)$_2$—MgO-PEO/Mo$_6$S$_8$ battery, as evidenced by capacity (lower curve) and coulombic efficiency (upper curve).

Embodiments of the disclosed batteries may exhibit cycling stability (as evidenced by a substantially constant specific capacity (mAh/g) for at least 50 cycles, at least 100 cycles, at least 150 cycles, or for greater than 50 cycles, greater than 100 cycles, or greater than 150 cycles (see, e.g., FIG. 3d). In certain embodiments, the anode has a capacity fade of less than 20%, less than 15%, less than 10%, or less than 5% after 50 discharge/charge cycles, after 100 discharge/charge cycles, or even after 150 discharge/charge cycles.

Without wishing to be bound any particular theory of operation, the superior characteristics of batteries including the solid-state electrolyte may be attributed to complexation of Mg and PEO, which facilitates dissociation of $Mg(BH_4)_2$, as well as the absence of a liquid solvent. Addition of ceramic nanoparticles, such as MgO nanoparticles, may further increase conductivity of the solid-state electrolyte.

IV. Example

A solid-state Mg electrolyte was prepared. PEO (MW=600,000 daltons), $Mg(BH_4)_2$ and MgO nanoparticles (<50 nm) in a weight ratio of 8:1:1 were put in an air-tight plastic bottle and ball-milled for 24 hours. The mixture was hot-pressed in a specially designed die at 120° C. and 10,000 lb (4540 kg) pressure for 20 minutes. A semitransparent thin film was formed and stored in an argon-filled glove box for use. All processes were performed without exposure to air.

Figure 2:
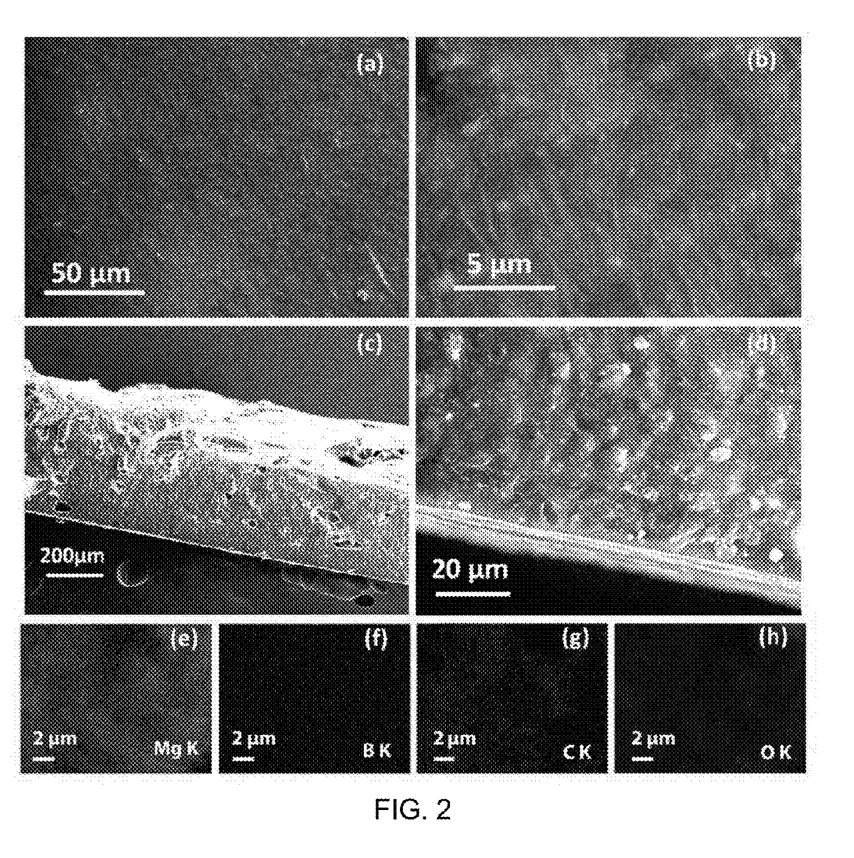
FIGS. 2a-2d are scanning electron microscope images of a Mg(BH$_4$)$_2$—MgO-PEO solid-state electrolyte.
FIGS. 2e-2h are element mapping images of the Mg(BH$_4$)$_2$—MgO-PEO solid-state electrolyte of FIGS. 2a-2d showing uniform dispersion of magnesium (2e), boron (2f), carbon (2g), and oxygen (2h).

FIG. 2 shows scanning electron microscope (SEM) images of the solid-state electrolyte film. The film surface was smooth (FIG. 2a) and the MgO nanoparticles were uniformly dispersed in PEO (FIG. 2b). From the cross-section images, the thickness of the film was estimated to be 200 μm (FIG. 2c). A dense and uniform structure was revealed (FIGS. 2c, 2d). The element mapping (FIGS. 2e-2h) shows uniformly dispersed Mg, B, C and O, indicating that $Mg(BH_4)_2$ and MgO were uniformly dispersed in PEO, consistent with the SEM images.

FIGS. 3a-3d show the electrochemical performance of Mg batteries with the solid-state electrolyte—$Mg(BH_4)_2$—MgO-PEO. Coin cells were prepared by cutting the solid-state electrolyte film and sandwiching the film between magnesium and stainless steel or between magnesium and $Mo_6S_8$. Cyclic voltammograms were obtained on a CHI 660D (CH Instruments, Inc., Austin, Tex.) with controlled temperature (100° C.).

Figure 5:
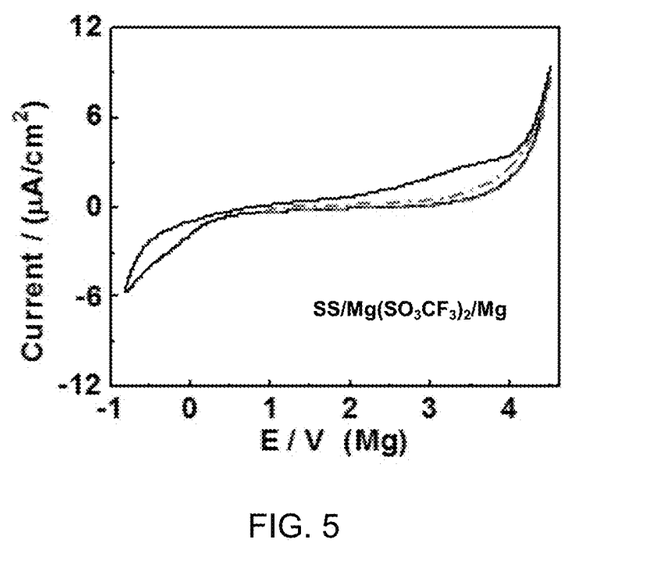
FIG. 5 is a cyclic voltammogram showing a lack of magnesium plating and stripping on a stainless steel electrode in a coin cell including a Mg(SO$_3$CF$_3$)$_2$ electrolyte between a stainless steel cathode and a magnesium anode; the solid line indicates anode behavior, and the dashed line indicates cathode behavior.

As shown in FIG. 3a, reversible Mg plating/stripping on a stainless steel electrode was achieved with a coulombic efficiency close to 100%. Coulombic efficiency is calculated by dividing the charge of Mg stripping by the charge of Mg plating. The voltage gap between onset potential for Mg plating and Mg stripping was only 0.2 V, indicating high reversibility and kinetics. The current density was improved in comparison with electrolytes comprising 0.01 M $Mg(BH_4)_2$ and short chain glymes (FIG. 4; see also U.S. application Ser. No. 13/858,764, which is incorporated herein by reference). The current density was also significantly higher than other solid-state electrolytes in literature (Chusid et al., *Adv. Mater.* 15, 627-630 (2003)). In contrast, a coin cell including a stainless steel cathode, a magnesium anode, and a solid magnesium salt electrolyte comprising magnesium triflate (i.e., $Mg(SO_3CF_3)_2$/MgO/PEO at a ratio of 5:1:8 by weight) did not demonstrate reversible Mg plating/stripping (FIG. 5).

Reversible Mg intercalation/de-intercalation in a cell including a magnesium anode and a $Mo_6S_8$ cathode is shown in FIG. 3b. A $Mo_6S_8$ cathode was selected to demonstrate the compatibility of the solid-state electrolyte with cathode materials because it is the most widely studied cathode material for Mg batteries, even though its capacity is low. The charge/discharge curves of a $Mg/Mg(BH_4)_2$—MgO-PEO/$Mo_6S_8$ cell show very flat plateaus (FIG. 3c). The cell also showed very high cycling stability as evidenced by substantially constant capacity over 150 cycles (FIG. 3d, lower curve), and the coulombic efficiency was close to 100% (FIG. 3d, upper curve). Capacity fade loss can be calculated from CE according to the following equation $$\text{capacity fade}=1-(CE)^n, n=\text{cycle number}$$

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. An electrolyte comprising:
   an all solid-state composition comprising
   $Mg(BH_4)_2$;
   A metal oxide of MgO; and
   polyethylene oxide.
2. The electrolyte of claim 1, where the electrolyte is a solid dispersion of $Mg(BH_4)_2$ and the metal oxide in polyethylene oxide.
3. The solid-state electrolyte of claim 1, where the solid-state electrolyte is a thin film having an average thickness from 15 μm to 400 μm.
4. The electrolyte of claim 1, wherein the metal is a Group IIA metal, a transition metal, or a combination thereof.
5. The electrolyte of claim 1, comprising:
   3-30 wt % $Mg(BH_4)_2$, based on a total weight of the electrolyte;
   55-92 wt % polyethylene oxide, based on the total weight of the electrolyte; and
   5-15 wt % metal oxide, based on the total weight of the electrolyte.
6. The electrolyte of claim 1, comprising:
   5-15 wt % $Mg(BH_4)_2$, based on a total weight of the electrolyte;
   73-88 wt % polyethylene oxide, based on the total weight of the electrolyte; and
   7-12 wt % metal oxide, based on the total weight of the electrolyte.
7. The electrolyte of claim 1, wherein the metal oxide further comprises $TiO_2$, $ZrO_2$, or a combination thereof.
8. The electrolyte of claim 1, where the metal oxide comprises metal oxide nanoparticles having an average diameter ≤500 nm.
9. The electrolyte of claim 8, where the electrolyte is a solid dispersion of $Mg(BH_4)_2$ and the metal oxide nanoparticles in polyethylene oxide.
10. The electrolyte of claim 1, where the electrolyte consists essentially of $Mg(BH_4)_2$, polyethylene oxide, and metal oxide.
11. The electrolyte of claim 10, consisting essentially of:
    3-30 wt % $Mg(BH_4)_2$, based on a total weight of the electrolyte;
    55-92 wt % polyethylene oxide, based on the total weight of the electrolyte; and
    5-15 wt % MgO nanoparticles, based on the total weight of the electrolyte, having an average diameter ≤500 nm.
12. A rechargeable battery, comprising:
    an anode comprising magnesium;
    a cathode; and
    the electrolyte of claim 1.
13. The rechargeable battery of claim 12, where the anode is magnesium metal.
14. The rechargeable battery of claim 12, where the cathode comprises stainless steel, $Mo_6S_8$, $Mg_2Mo_6S_8$, $MoS_2$, $Mo_6S_{8-y}Se_y$, where y=0, 1, or 2, $Mg_xS_3O_4$ where $0<x<1$, $MgCoSiO_4$, $MgFeSiO_4$, $MgMnSiO_4$, $V_2O_5$, $WSe_2$, sulfur, poly(2,2,6,6-tetramethylpiperidinyloxy-4-yl methacrylate)/graphene, $MnO_2$/acetylene black, or carbyne polysulfide.
15. The rechargeable battery of claim 12, where the anode has a capacity fade of less than 20% after 50 discharge/charge cycles.
16. The rechargeable battery of claim 12, where the battery has a coulombic efficiency ≥95%.
17. A method for making an all solid-state magnesium electrolyte of claim 1, comprising:
    making an all solid-state magnesium electrolyte by
        forming an electrolyte mixture comprising $Mg(BH_4)_2$, polyethylene oxide, and a metal oxide a Group IIA metal, a transition metal, or a combination thereof; and
    forming a thin film of the electrolyte mixture.
18. The method of claim 17, where the thin film consists essentially of:
    3-30 wt % $Mg(BH_4)_2$, based on a total weight of the thin film;
    55-92 wt % polyethylene oxide, based on the total weight of the thin film; and
    5-15 wt % metal oxide, based on the total weight of the thin film.

* * * * *

UNITED STATES PATENT AND TRADEMARK OFFICE
CERTIFICATE OF CORRECTION

PATENT NO. : 9,437,899 B2  Page 1 of 1
APPLICATION NO. : 14/177115
DATED : September 6, 2016
INVENTOR(S) : Yuyan Shao It is certified that error appears in the above-identified patent and that said Letters Patent is hereby corrected as shown below:

In the Specification

In Column 1, Line 8, "DE-AC0576RLO1830" should be --DE-AC05-76RL01830--.

In Column 7, Line 56, "bound any particular" should be --bound by any particular--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*